Oct. 30, 1951     E. A. ROBINSON     2,573,609
METHOD OF MAKING INFLATABLE ARTICLES
Filed Dec. 14, 1946
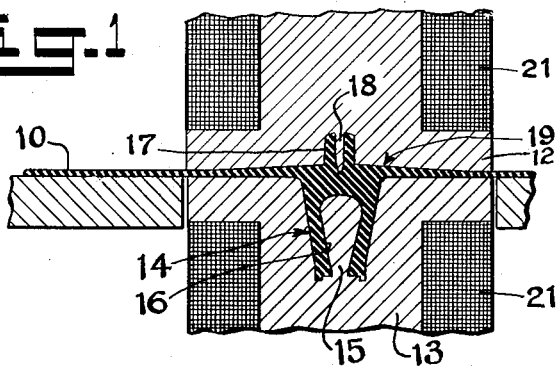
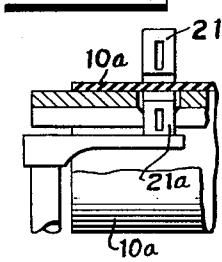
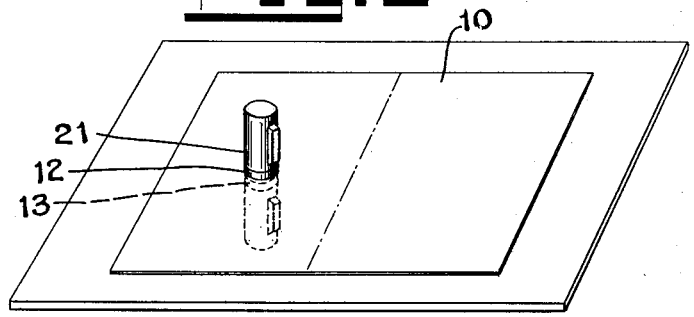
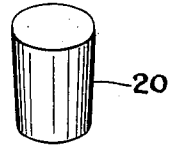
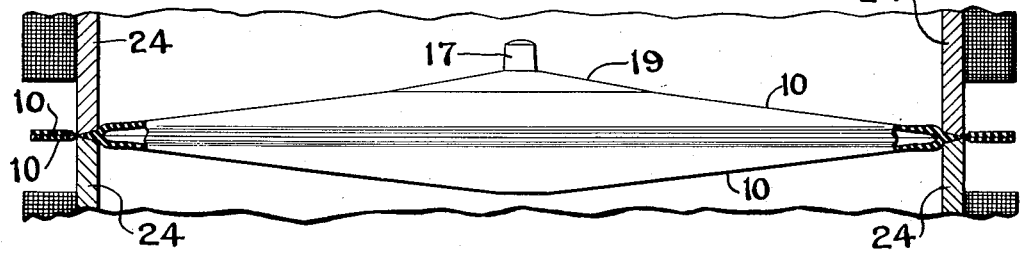
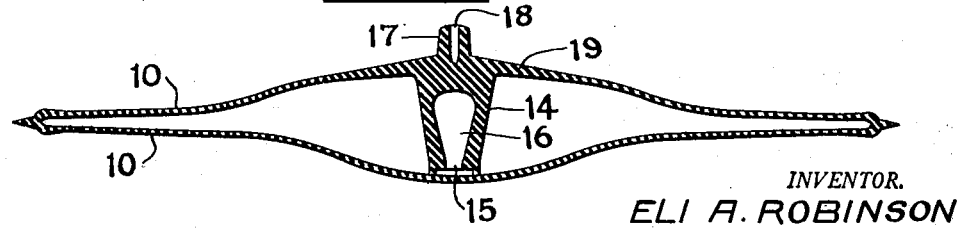
*INVENTOR.*
ELI A. ROBINSON
BY
Bohleber, Fassett & Montstream
*ATTORNEYS*

Patented Oct. 30, 1951

2,573,609

UNITED STATES PATENT OFFICE 2,573,609

METHOD OF MAKING INFLATABLE ARTICLES

Eli A. Robinson, Amsterdam, N. Y.

Application December 14, 1946, Serial No. 716,305

10 Claims. (Cl. 154—85)

1

The invention relates to an inflatable article having a valve for retaining air or gas therein and also relates to its method of manufacture. It is the present practice in making inflatable articles such as the bladders for footballs and other playballs to shape the bladder from two superimposed sheets and seal the edges between the two superimposed layers of material. The envelope so formed is vulcanized. A valve of rubber is separately molded and cured and then cemented to the vulcanized envelope to form the completed bladder. This entails separate molding of the valves with a flange which are usually molded en masse of many valves, cutting each valve and its flange from the mass, inspecting the same and the envelope, buffing the flanged surface of the valve and tumbling to remove rubber dust, washing or buffing the envelope where the valve is to be attached, applying two coats of cement on both the valve and envelope with drying time in between, then inserting the valve upon the envelope and pressing the two together until cemented to form the completed bladder. With the invention to be described all of these steps are eliminated, to produce a bladder by a much simpler method. In the manufacture of tire tubes a substantially similar method is used.

In addition to the many steps involved in making an inflatable article as described above, it is difficult to obtain an air-tight seal between the valve and the inflated envelope. A slight bit of moisture on the cemented surfaces prevents the cement from holding which produces a leak and it is extremely difficult to eliminate all moisture in the manufacturing process. As a consequence, there are many failures or leaks in the finished bladder when made by the method described.

The simultaneous molding and curing of a valve and curing of a tubular envelope to form a tire tube is known. In this process the tire tube envelope is inflated in order to create internal pressure to shape an uncured plug within the valve mold. Whenever air pressure is utilized in order to create the pressure in the molding process, a leakage of air is encountered many times during the molding process when the rubber-like material is in soft and plastic form. Usually the air leaks along the metal insert, which prevents vulcanizing adhesion between the insert and the rubber being molded. With the method to be described mechanical pressure is used upon both sides of the uncured envelope layer, with the result that where metal inserts

2 are used to form a part of the valve, adhesion between the metal insert and the rubber material is assured.

It is an object of the invention to construct a new and novel inflatable article.

Another object is to provide a new and novel method of producing an inflatable article.

Another object is to provide a method to mold or vulcanize a valve or other structure to an unvulcanized sheet by mechanical restraint or pressure and without the use of air pressure or vacuum.

A further object is to provide a method for molding and vulcanizing an inflatable article by first molding and vulcanizing the heavier structure such as the valve.

A still further object is to make an inflatable article by molding and curing or preferably partially curing the valve stem and curing or partially curing the envelope edges and thereafter curing the envelope and completing the curing of the valve and edges.

Other objects of the invention will be more apparent from the following description when taken in connection with the accompanying drawing illustrating a preferred embodiment of the invention, in which:

Figure 1 is a cross-section through an uncured sheet with the molds on each side thereof for shaping and partially curing the valve and integrally molding the valve to the sheet.

Figure 2 is a perspective view in reduced size of the valve molding step.

Figure 3 is a view of the uncured plug which is inserted into the mold.

Figure 4 is a cross-section through the dies for partially vulcanizing the edges between the two layers of the envelope.

Figure 5 is a section through the vulcanized edges stretched out as when the bladder is inflated.

Figure 6 is a partial section through the finished valve and envelope but without the plastic air seal in the plastic chamber.

Figure 7 is a reduced view of a construction for vulcanizing a valve upon an uncured inner tube.

The invention will be first described particularly in relation to a bladder such as a football bladder which is inflated within a casing. It is to be understood, however, that the so called bladder may be made of heavier material and serve as the complete football. A sheet 10 is rolled or formed of uncured rubber-like or vulcanizable material which may be crude rubber or any one of the synthetic substitute rubbers.

This sheet is cut to length sufficiently long to form two layers for the resulting envelope. This is to assure that each layer forming the one bladder is of uniform thickness and also aids in handling.

For a football bladder having a plastic type of valve, two molds 12 and 13 are provided, one being placed on one side of the uncured sheet to form the valve stem. The mold has a cavity 14 in which there is a stem 15 carrying an enlarged portion or core 16 to form a needle channel and a plastic chamber in the valve stem. The other mold is placed on the other side of the sheet and has a cavity 17 with a stem 18 therein to form a needle guide. Preferably this mold has a slight tapering recess 19 in order to increase the thickness of material at the valve stem.

A plug 20 of uncured rubber-like or vulcanizable material is placed within the larger mold cavity 14 whereupon the two molds are pressed together mechanically and heat applied such as by an electric winding 21 upon at least one but preferably carried by each mold. The uncured rubber of the plug and of the sheet 10 between the molds becomes plastic and flows together to form an integral whole and are shaped to the mold cavities. Heat and pressure are applied long enough to partially cure the valve structure and the sheet lying between the molds, the curing being generally about fifty per cent of that of complete curing. The partial curing is desirable for two reasons, first because of the later curing of the entire bladder and secondly, particularly where a plastic valve is made, in that the enlarged core 16 in the mold cavity 14 which forms the cavity in the valve stem for the plastic sealing material, is easier to remove when the rubber is in semi-cured and more plastic condition and lessens the possibility of tearing the end of the valve stem. The valve structure may be fully cured, however, this is undesirable with some rubber stocks since the valve becomes overcured when the whole bladder is later cured. Any over-cured portions tend to deteriorate more rapidly and lose strength in use.

The sheet 10 of uncured rubber-like material is then folded over to provide a two layer thickness. Dies 24, as shown in Figure 4, are then applied to the folded over sheets which dies are pressed together and heated to partially vulcanize the same at the edges of the bladder. The dies are shaped to conform to the bladder shape desired and for a football bladder would be oval. In this molding or partial vulcanizing step, the plastic rubber-like material forms a thickened portion at or just outside of the inner edges of the dies as shown in Figures 4 and 5 so that a strong and vulcanized seam or edge is produced. This thickening may form a bead at the inner edge of the seam so that the slight V disappears and also forms the thickening of the layers adjacent to the seam. The faces of the dies are tapered outwardly so that the bladder is completely severed in the seam forming operation or a thin section results at the outer periphery of the seam or edge, depending upon the shape of the cutting edge of the die, the heat and pressure applied, and the time interval that the bladder is held between the dies, which substantially reduces the rib which forms at the seal when inflated. The seam preferably is cured approximately fifty per cent, although considerable latitude is permissible in the degree of curing. It is to be understood also that the bladder may be formed of more than two sections in case a shaped, as distinguished from the flat bladder described, is desired.

It will be noted that the bladder so formed has a semi-cured valve and a semi-cured seam or edge with the remainder of the overlying sheets of the bladder envelope being uncured. The bladder may then be inserted in an oven where the envelope is cured during which process the seam and the valve structure are completely cured. It can also be cured by inflating the bladder in a heated mold or by using the conventional steam and air pressure methods.

The process for making football bladders described enables projecting valve structure to be formed on both sides of the valve sheet and permits particularly projecting valve structure upon the inside of the bladder, that is, on the surface which finally becomes the inner surface of the bladder. Since the valve structure and the bladder layer are molded and partially cured at the same time, the material of the layer and of the plug flow together as a unit to form an integral valve with the bladder sheet in which there can be no leakage. Furthermore, since the valve and the area of the sheet around the valve are molded and partially cured simultaneously the molding dies can be pressed together so that the layer thickness at the valve is approximately the same as or at most slightly greater in thickness than the original uncured sheet. With a cemented valve structure the layer thickness surrounding the valve is at least twice the bladder layer thickness. This introduces more unbalance in the finished bladder. With the molded valve described herein, the layer thickness will be the same or approximately the same as the initial bladder layer so that to this extent unbalance has been reduced. Of course projecting valve parts continue to produce some unbalance in the bladder and hence in the finished ball when mounted in a casing.

The invention is applicable in making inner tubes for tires. Here again the uncured layer of envelope 10a is formed which usually is by an extruding process which results in a tubular envelope. This envelope is cut to length. A valve stem mold 21 has an uncured plug of rubber-like or vulcanizable material inserted therein and the mold is then placed upon the outer surface of the tubular envelope. A backing up means 21a is projected into the open end of the envelope and in alignment with the mold. In the molding of a tire tube valve stem, no part of the valve structure need be within the envelope and hence the backing up means need not have a molding cavity. Heat is applied to the mold and preferably to the backing up means and mechanical pressure is applied therebetween. The plug of uncured rubber-like material flows under the heat and the pressure to fill the mold cavity. The valve structure and an area of the tubular envelope around the valve is preferably partially cured although it may be fully cured as the valve structure is shaped.

The two ends of the tubular envelope are then brought together and the seam is partially cured although it may be fully cured to seal the juncture. Thereafter the inner tube is inserted in an oven where the tubular envelope is cured and also finished curing of the partially cured valve structure and the joining seam is obtained. In this process mechanical pressure is used in forcing the plastic rubber-like or vulcanizable material into the mold cavity in molding the valve structure with the result that the valve structure forms an integral whole with the tubular envelope and no leaks can occur as may occur when the curing takes place under air pressure.

With the football bladder and the tire tube metallic inserts may be provided in the molds to form a metallic insert valve. The metallic inserts adhere tightly to the rubber valve stem since mechanical pressure presses the heated plastic rubber-like material into contact with the metallic insert and no space is left for air leakage.

The invention is presented to fill a need for improvements in an inflatable article and its method of production. It is understood that various modifications in structure, as well as changes in mode of operation, assembly, manner of use, and manner of manufacture, may and often do occur to those skilled in the art, especially after benefiting from the teachings of an invention. Hence, it will be understood that this disclosure is illustrative of preferred means and method of embodying the invention in useful form by explaining the construction, operation and advantages thereof.

What is claimed is:

1. A method of making an inflatable valved article comprising forming a thin layer of uncured vulcanizable material, inserting a plug of uncured vulcanizable material within a mold, applying the mold against the layer of material, applying a backing-up means upon the other side of the layer in alignment with the mold, pressing the mold and the backing up means together, heating the mold to obtain plastic merging of the layer and plug and to shape and at least partially cure the molded structure and to at least partially cure the layer under the mold around the structure, forming an enclosed envelope including the layer and its partially cured structure, and then curing the entire envelope.

2. A method of making an inflatable valved article comprising forming a layer of uncured vulcanizable material, inserting a plug of uncured vulcanizable material within a mold, applying the mold against the layer of material, applying a backing-up means upon the other side of the layer in alignment with the mold, pressing the mold and the backing up means together, heating at least the mold to obtain plastic merging of the layer under the mold and the plug and to shape and at least partially cure the molded structure and to at least partially cure the layer under the mold around the molded structure, forming an enclosed envelope including the layer and its molded structure and at least partially curing the seam formed thereby, and then curing the entire envelope.

3. A method of making an inflatable valved bladder comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one mold to obtain plastic merging of the sheet between the molds and the plug and to shape and a least partially cure the molded structure and to at least partially cure the sheet around the molded structure, forming an enclosed envelope with the molded sheet forming at least a part thereof, and then curing the entire envelope.

4. A method of making an inflatable valved bladder comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one of the molds to obtain plastic merging of the sheet and plug and to shape and at least partially cure the molded structure and at least partially cure the sheet around the molded structure, forming an enclosed envelope with the molded sheet forming at least a part thereof, and at least partially curing the seam formed thereby, and then curing the entire envelope.

5. A method of making an inflatable valved article comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one of the molds to obtain plastic merging of the sheet and plug and to shape and at least partially cure the molded structure and at least partially cure the sheet around the molded structure, forming an enclosing envelope with the molded sheet as a part thereof by pressing heated dies with inclined faces against the layers to be joined together to form an enclosed envelope therefrom with a wedge shaped seam, the heated dies at least partially curing the seam formed thereby, and then curing the entire envelope.

6. A method of making an inflatable valved bladder comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one mold to obtain plastic merging of the layer under the molds and plug and to shape and at least partially cure the molded structure and to at least partially cure the sheet around the molded structure, folding over the sheet to provide two overlying layers, forming an enclosed envelope from the overlying layers, and then curing the entire envelope.

7. A method of making an inflatable valved bladder comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one of the molds to obtain plastic merging of the sheet and plug and to shape and at least partially cure the molded structure and at least partially cure the sheet around the molded structure, folding over the sheet to provide two overlying layers, forming an enclosed envelope from the overlying layers and at least partially curing the seam formed thereby, and then curing the entire envelope.

8. A method of making an inflatable valved article comprising forming a sheet of uncured vulcanizable material, inserting a plug of uncured vulcanizable material within a mold, applying the mold against one side of the sheet of material, applying a second mold upon the other side of the sheet in alignment with the first mold so that each mold mechanically backs up the other, pressing the molds together, heating at least one of the molds to obtain plastic merging of the sheet and plug and to shape and at least partially cure the molded structure and at least partially cure the sheet around the molded structure, folding over the sheet to provide two overlying layers, pressing heated dies of the shape of the article and with inclined faces against the overlying layers to form an enclosed envelope therefrom with a wedge shaped seam, the heated dies at least partially curing the seam formed thereby, and then curing the entire envelope.

9. A method of making an inflatable valved article comprising forming a tubular layer of uncured vulcanizable material, inserting a plug of uncured vulcanizable material within a mold, applying the mold against the outer surface of the tubular layer, applying a backing-up means upon the other side of the layer in alignment with the mold, pressing the mold and the backing-up means together, heating at least the mold to obtain plastic merging of the layer and plug and to shape and at least partially cure the molded structure and to at least partially cure the layer under the mold around the molded structure, joining the ends of the tubular layer to form an enclosed envelope, and then curing the entire envelope.

10. A method of making an inflatable valved article comprising forming a tubular layer of uncured vulcanizable material, inserting a plug of uncured vulcanizable material within a mold, applying the mold against the outer surface of the tubular layer, applying a backing-up means upon the other side of the tubular layer in alignment with the mold, pressing the mold and the backing-up means together, heating at least the mold to obtain plastic merging of the layer under the mold and the plug and to shape and at least partially cure the molded structure and to at least partially cure the layer under the mold around the molded structure, joining the ends of the tubular layer to form an enclosed envelope and at least partially curing the seam formed thereby, and then curing the entire envelope.

ELI A. ROBINSON.

REFERENCES CITED

The following references are of record in the file of this patent:

UNITED STATES PATENTS

| Number | Name | Date |
|---|---|---|
| 1,310,436 | Roberts | July 22, 1919 |
| 1,473,260 | Taylor | Nov. 6, 1923 |
| 1,649,734 | Roberts et al. | Nov. 15, 1927 |
| 2,230,879 | Bronson | Feb. 4, 1941 |
| 2,324,974 | Greenup | July 20, 1943 |
| 2,329,346 | Goff | Sept. 14, 1943 |
| 2,430,076 | Pollock | Nov. 4, 1947 |